United States Patent [19]
Greisner et al.

[11] Patent Number: 5,271,182
[45] Date of Patent: Dec. 21, 1993

[54] DEVICE FOR OPENING AND CLOSING THE PANEL OF A WINDOW, DOOR, VENTILATION HATCH, OR SIMILAR CLOSURE

[75] Inventors: Paul Greisner, Telgte; Dieter Renz, Ibbenbüren; Horst Schwenk, Münster; Martin Langner, Telgte, all of Fed. Rep. of Germany

[73] Assignee: Aug.Winkhaus GmbH & Co. KG, Telgte, Fed. Rep. of Germany

[21] Appl. No.: 947,165

[22] Filed: Sep. 18, 1992

[30] Foreign Application Priority Data

Sep. 24, 1991 [DE] Fed. Rep. of Germany ....... 4131762

[51] Int. Cl.$^5$ ............................................. E05F 11/00
[52] U.S. Cl. ................................................... 49/325
[58] Field of Search ................... 49/325, 324

[56] References Cited

U.S. PATENT DOCUMENTS

| | | | |
|---|---|---|---|
| 2,045,261 | 6/1936 | Clute | 49/325 X |
| 4,481,735 | 11/1984 | Jentoft et al. | 49/325 |
| 4,726,247 | 2/1988 | Hormann | 49/325 X |
| 4,819,495 | 4/1989 | Hörmann | 49/325 X |
| 4,945,678 | 8/1990 | Berner et al. | 49/325 X |

FOREIGN PATENT DOCUMENTS

466786 6/1937 United Kingdom ................ 49/325

Primary Examiner—Philip C. Kannan
Attorney, Agent, or Firm—Brumbaugh, Graves, Donohue & Raymond

[57] ABSTRACT

A device (16b) for tilting windows, doors, ventilation hatches, or similar closures open, with a motorized transmission-activating mechanism (12b) and a transmission (14b) comprising two back-to-back chains that curve in opposite directions.

15 Claims, 6 Drawing Sheets

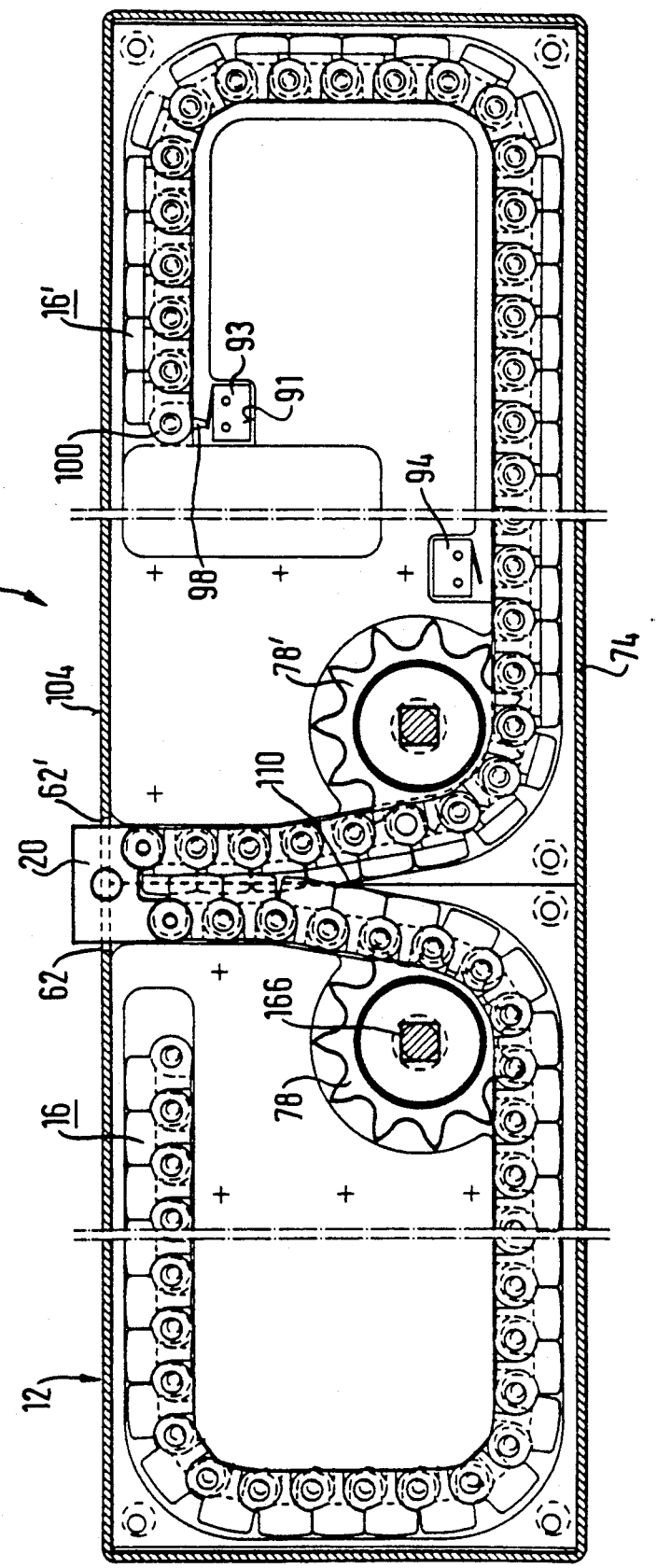

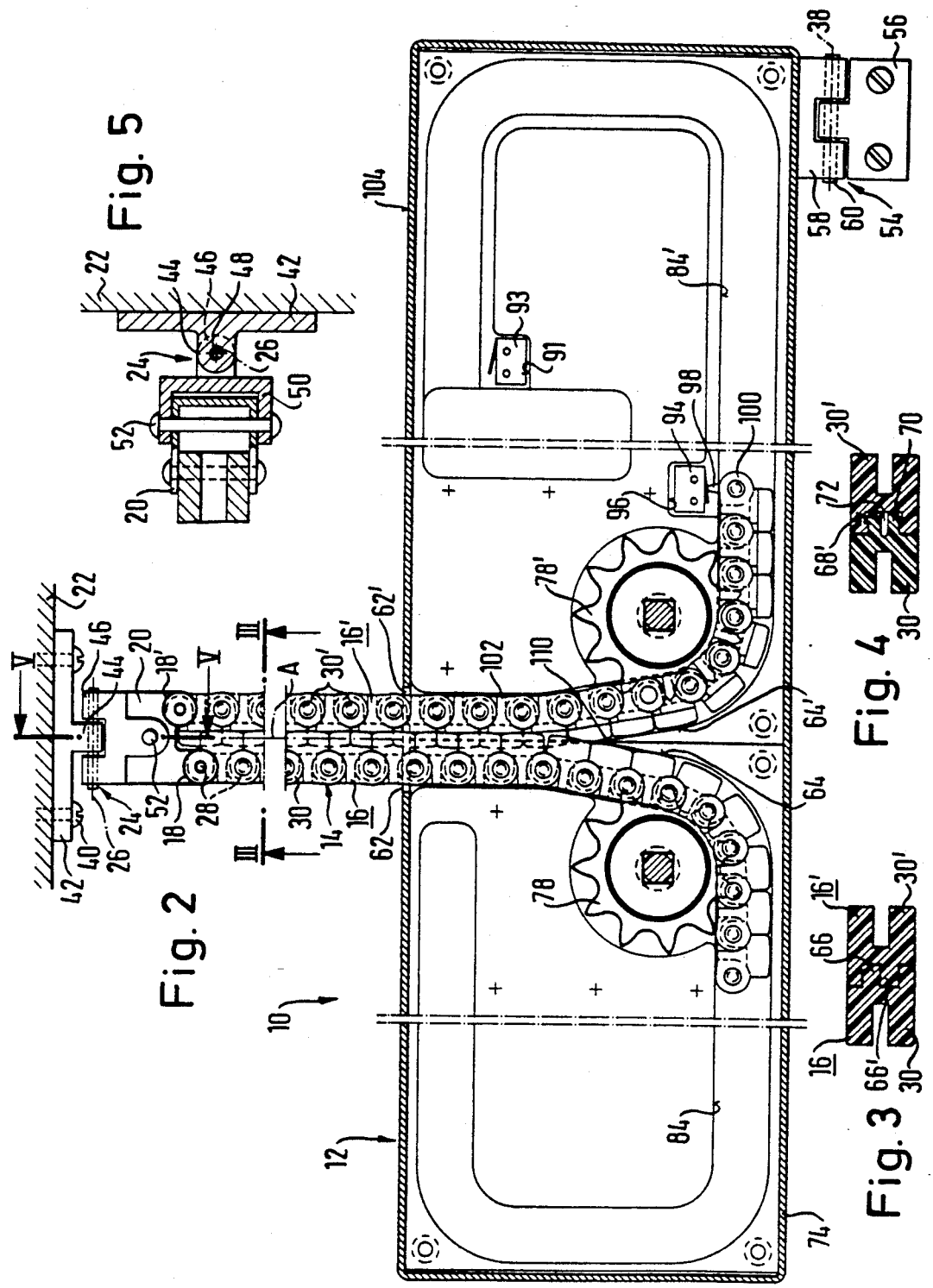

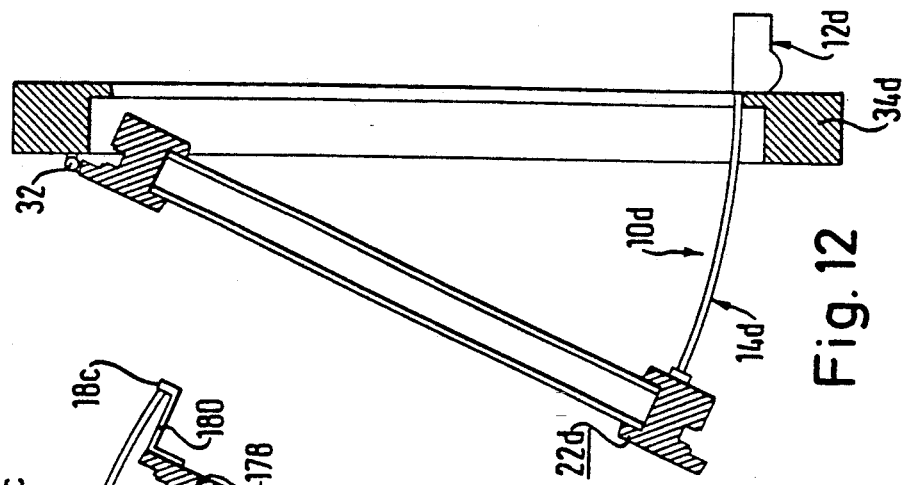
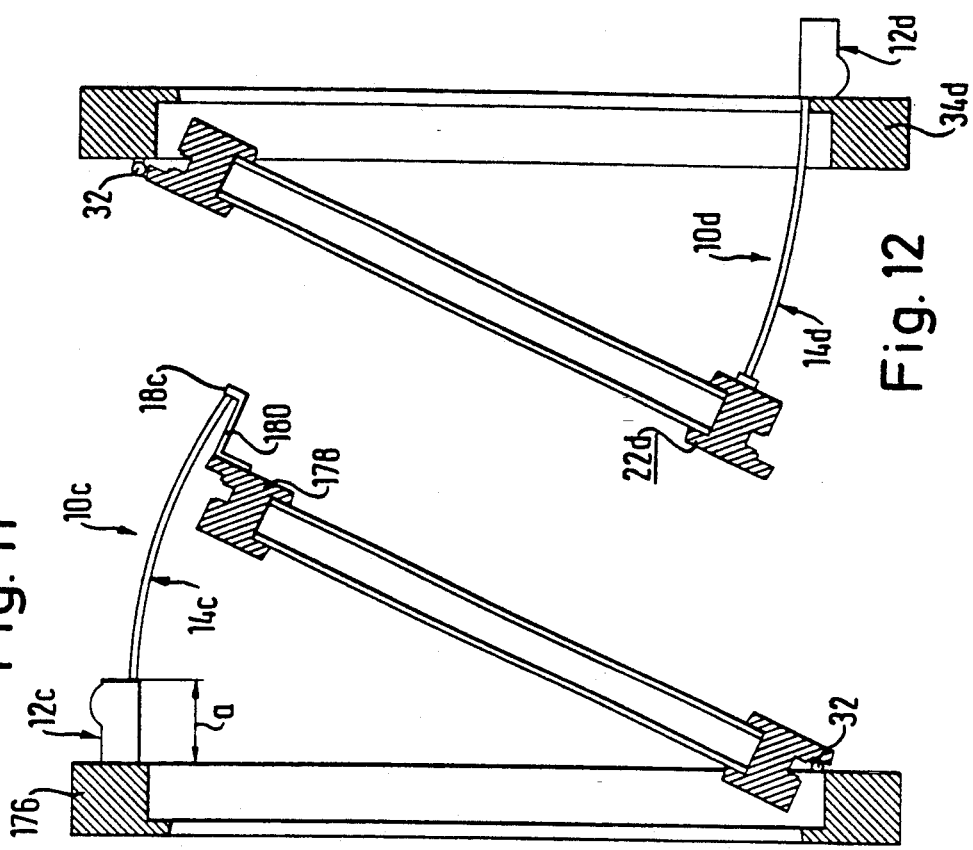
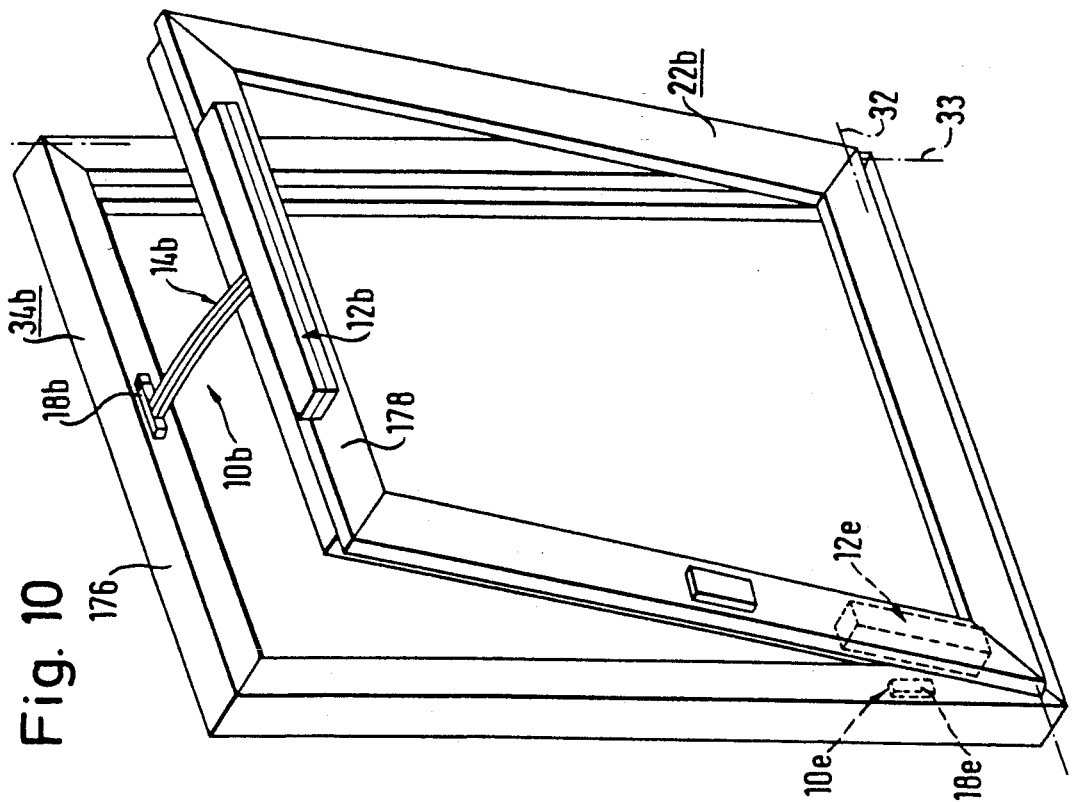

DEVICE FOR OPENING AND CLOSING THE PANEL OF A WINDOW, DOOR, VENTILATION HATCH, OR SIMILAR CLOSURE

FIELD OF THE INVENTION

The invention concerns a device for opening and closing the panel of a window, door, ventilation hatch, or similar closure. The device consists of a transmission that extends between the panel and a stationary frame and of a mechanism mounted on the panel or on the frame and activating the transmission. The transmission constitutes a chain that will curve in only one direction, its links being articulated such that it can be deflected out of a straight line only to one side, the deflection side, in a plane perpendicular to the axis of articulation. The chain extends straight out from its point of emergence from the transmission-activating mechanism to its point of attachment to the frame or panel. At least one section of the chain curves inside the transmission-activating mechanism.

DESCRIPTION OF THE PRIOR ART

Opening-and-closing devices of this type are known (cf. GB Patent 1 091 528, U.S. Pat. Nos. 3 090 613, 3 911 802, 4 014 136, 4 382 349, and 4 521 993, and German OS's 3 932 086 and 3 936 136). The single chain that constitutes the transmission will curve in only one direction because its design ensures that, when it is straight, its links will be forced together and will physically prevent the chain from being deflected except to the deflection side. A single chain of this genus is disclosed in the aforesaid U.S. Pat. No. 4 521 993 as a transmission between a stationary frame and the panel of a closure. One end of the free section of chain is secured to a transmission-activating mechanism 60 on the frame by a track 65 and the other end to a point 21 of attachment on the panel by another track 67, such that both ends of the free section are in line with each other. In this way the free section of the chain is stretched out straight, with its links being forced together with mutual abutment in their straight positions. The free section accordingly remains rigid when axially subjected to either tension or compression and will not need any track between its point of emergence from the transmission-activating mechanism and its attachment to the frame or panel. When the free section, especially of a simple and hence cost-effective chain, is too long, however, the chain will tend to curve into a more or less pronounced S. Since the resistance to axial compression of a curved chain is definitely lower than that of a straight chain, the chain will curve more and more extensively as more and more compression is applied. The chain can in consequence become damaged and the overall device even incapable of functioning. The known device is accordingly restricted to short spans and relatively weak compression. The use of a stronger chain is in most cases ruled out not only because of its expense, but also because it will be too large to fit the available space.

European Patent publications 0 232 803 A1 and 0 165 497 A2 concern a garage-door opener with a transmission comprising two parallel chains, cords, or strips that can be linearly displaced in a rigid track over an extended area. A connector at the free end of the chains remains inside the track, which has a slot for attaching the connector to a component to be moved. Each chain is activated by a worm gear with a thread that operates in conjunction with a semicircular threaded half at one end. The chains and strips are conventional and curve in two directions. The tracks not only ensure mutual back-and-forth engagement of the chains over the extended area but also provide the absolutely necessary rigidity subject to compression. The track is employed even when the chains or strips mechanically engage each other like the halves of a zipper (EP 0 165 497, FIG. 7).

Japanese 52-37 668 A discloses a transmission comprising two chains consisting of blocks 4 connected by plates 8. When the chains are straight, each block in one chain locks in between two in the other. FIG. 3 on page 359 illustrates a force F exerted by a block in one chain on a block in the other. Since the interface between the blocks is perpendicular to the length of the chains and undulating, stability will increase with force F. FIG. 1 indicates that each chain of itself can curve in both directions. The extended chains interpenetrate like the halves of a zipper, and it cannot be said that they rest back-to-back. The force exerted at the state of the art (European patent publications 0 232 803 A1 and 0 165 497 A2 and Japanese 52-37 668 A) extends in a zig-zag between the links of the two chains.

SUMMARY OF THE INVENTION

The object of the present invention is a device of the aforesaid type that will be simple and small and allow wider opening subject to more powerful compression, while spanning the gap between the panel and the stationary frame unsupported, without a track, that is.

This object is attained in accordance with the invention in that the transmission comprises two chains, each of which can curve out only in one direction, specifically opposite that of the other. Since their points of attachment and points of emergence are both directly adjacent, the chains rest back-to-back between the points of attachment and emergence, and each chain curves out from the side opposite its back.

Since the chains rest back-to-back outside the transmission-activating mechanism, the transmission is essentially more stable. The increased stability derives from the immediate absorption by one chain or the other of transverse forces acting on the two chains (perpendicular to the length of the chain and to the axes of articulation) due to the design that prevents them form curving in that particular direction. Even a partial S-shaped, for example, curvature on the part of one chain or the other will be reliably prevented. Both chains will be stretched to the precise straightness that ensures maximal resistance to axial compression. The chains can be relatively slender, occupying less space and costing less. The transmission and hence the activating mechanism that accommodates it is in no way higher overall perpendicular to the axes of articulation of the links due to the inclusion of the second chain. Since both chains curve around a relatively small minimal radius, the transmission-activating mechanism need not be too large parallel to the transmission in order to accommodate the two lengths of chain when the panel is closed, even all the way. The overall width is, of course, greater because the lengths of chain extend away from each other inside the transmission-activating mechanism. Since the width parallels the length of the sleeper, which accommodates the activating mechanism, it can generally be increased with no problem. If the cross-section of the chain is approximately 10×10 mm, the two-chain system in accordance with the invention can easily span gaps of approximately 400 mm and withstand axial tensions and compressions of approximately 500N. The links can be steel and/or plastic.

Using two back-to-back chains that curve only away from each other in accordance with the invention also makes it astonishingly easy for the pair of chains to stabilize in response to compression at high mechanical strength because the forces of compression will distribute themselves to two chains that are in themselves resistant to compression.

It is particularly preferable to use the device in accordance with the invention for opening and closing a panel that pivots around a pivoting articulation on a stationary frame. In this embodiment, the transmission-activating mechanism pivots either on the panel or on the frame around an axis that parallels the axis of the pivoting articulation, and each chain is articulated to its point of attachment to the frame or to the panel on a common axis that also parallels the axis of the pivoting articulation. Depending on how the device is mounted, either the articulation axis or the pivoting axis will travel along the arc of a circle when the panel opens or closes. Due to the pivoting attachment of both the transmission-activating mechanism and the two ends of the chains, the transmission-activating mechanism and the transmission can constantly adjust themselves along a line (secant) between the pivoting axis and the articulation axis while the panel is opening or closing. The chains will accordingly always remain straight enough to accommodate maximal axial compression.

To increase the stability of the transmission even further, the backs of the chains can interlock while they extend straight between their points of attachment and points of emergence. Any forces within a plane perpendicular to the length of the chains will accordingly be immediately transmitted from one chain to the other, and each chain will effectively support the other.

The backs of the chains in an advanced version of this embodiment can interlock such that forces along the length of the chains can be transmitted from one chain to the other. Thus, forces paralleling the length of the chains can also be transmitted from one chain to the other. This is of particular advantage when, to simplify the device, only one chain is actually activated directly. The design in accordance with the invention distributes the activating forces between the two chains.

The mutual engagement between the two chains is preferably attained in that the back of at least one of the chains has a ridge that extends along it and engages a matching depression in the back of the other chain. Such a ridge and depression are cost-effective and ensure satisfactory mutual engagement even when the ridges and depressions are in alignment along the chains, allowing mutual longitudinal displacement of the chains.

The backs of the chains in one alternative of this embodiment engage each other by way of a dovetail-like connection comprising an undercut groove that extends along one of the chains and of a ridge that matches the cross-section of the groove on the other chain, whereby the sides of the groove and of the ridge are resilient enough to allow the ridge and groove to snap together and apart. The dovetail-like connection improves the adhesion between the two chains by allowing the chains to immediately absorb any forces tending to separate the chain perpendicular to their length. The resilience facilitates establishing and disestablishing the connection.

The transmission can be rendered even more stable if the two chains are mutually displaced, preferably half the length of a link, while extending straight between their points of attachment and points of emergence. Such a displacement ensures that the point of articulation between two links in one chain will always be opposite the solid back of a link in the other chain. This will further reduce motion between the links.

To simplify attaching them while retaining the aforesaid displacement, the chains can pivot around their points of attachment with one end against the frame or panel on a C-shaped holder that is common to both chains.

Each chain in one embodiment of the invention that is particularly outstanding for stability and hence life and strength is activated by a chain-drive cogwheel that engages a curved section of the chain. The two chains are accordingly operated independent but in principle identically, so that operational stresses between the two chains is generally excluded. Each wheel, again, need only exert half the force of activation, which considerably reduces wear.

To allow use of a relatively cost-effective, small, and high-speed motor with a relatively low torque, each chain-drive cogwheel can be activated by a planetary gear and the two gears can be powered by a common motor. The planetary gears will be low-wear because each will have to transmit only half of the total power.

The complexity of the design and hence the cost of manufacture can alternatively be reduced if only one of the chain-drive cogwheels is activated by a planetary gear powered by a motor, whereby the second wheel is coupled to the first. To reduce costs even more, only one of the chains can be activated by a chain-drive cogwheel powered by a motor.

To make it possible to reliably retain the panel in any position, especially closed, the transmission-activating mechanism can lock into position automatically. It is preferable to attain this feature with an automatically locking gear, preferably a worm gear, between the motor and the mechanism that activates one or both chains.

A simple design that will reliably guide the chain inside the transmission-activating mechanism can be attained if the transmission-activating mechanism has at least one flat, preferably plastic, component with a channel for one of the chains. It will be particularly advantageous for the transmission-activating mechanism to have two flat surface-to-surface plastic components with symmetrical channels that create a completely enclosed passage for the particular chain. Since each individual flat component has only an open channel or groove instead of an enclosed accommodation, they are particularly cost-effective.

The planetary gear in one advanced version of the invention has a support that rotates with the chain-drive cogwheel, a sun wheel that engages an intake cogwheel, a housing with teeth around its inner surface, and planet wheels that rotate on the support and engage the teeth in the housing and on the sun wheel. Such a planetary gear is simple and stable. It is preferable in this event for the intake cogwheel to engage a worm gear, preferably by way of an intermediate spur gear, and for the worm to be mounted tight on the output shaft of the motor. A stable and cost-effective design can be ensured by interposing the intermediate spur gear and the planetary-gear housing between two gear bases, separated by at least three spacers.

The invention also concerns a window or ventilating hatch, especially for a conservatory or greenhouse or for a smoke-and-heat exhaust system opened and closed by the aforesaid device.

The various features of novelty which characterize the invention are pointed out with particularity in the claims annexed to and forming part of this disclosure. For a better understanding of the invention, its operating advantages and specific objects attained by its use, reference should be had to the accompanying drawings and descriptive matter in which there are illustrated and described preferred embodiments of the invention.

BRIEF DESCRIPTION OF THE DRAWINGS

Preferred embodiments of the invention will now be specified with reference to the attached drawing, wherein FIG. 1 is a top view of the device in accordance with the invention (section along the line I—I in FIG. 7) with the transmission retracted;

FIG. 2 is a section similar to that in FIG. 1 but with the transmission extended;

FIG. 3 is a section through the transmission along the line III—III in FIG. 2;

FIG. 4 is a section like that in FIG. 3 through another embodiment of the transmission;

FIG. 5 is a section along the line V—V in FIG. 2;

FIGS. 8 through 12 illustrate various examples of how a device in accordance with the invention can be employed, specifically FIG. 8 with a hatch in a roof, FIG. 9 with a window in a roof, FIG. 10 with a bottom-hinged window, FIG. 11 with another bottom-hinged window, and FIG. 12 with a top-hinged window.

DESCRIPTION OF PREFERRED EMBODIMENTS

Figure 6:
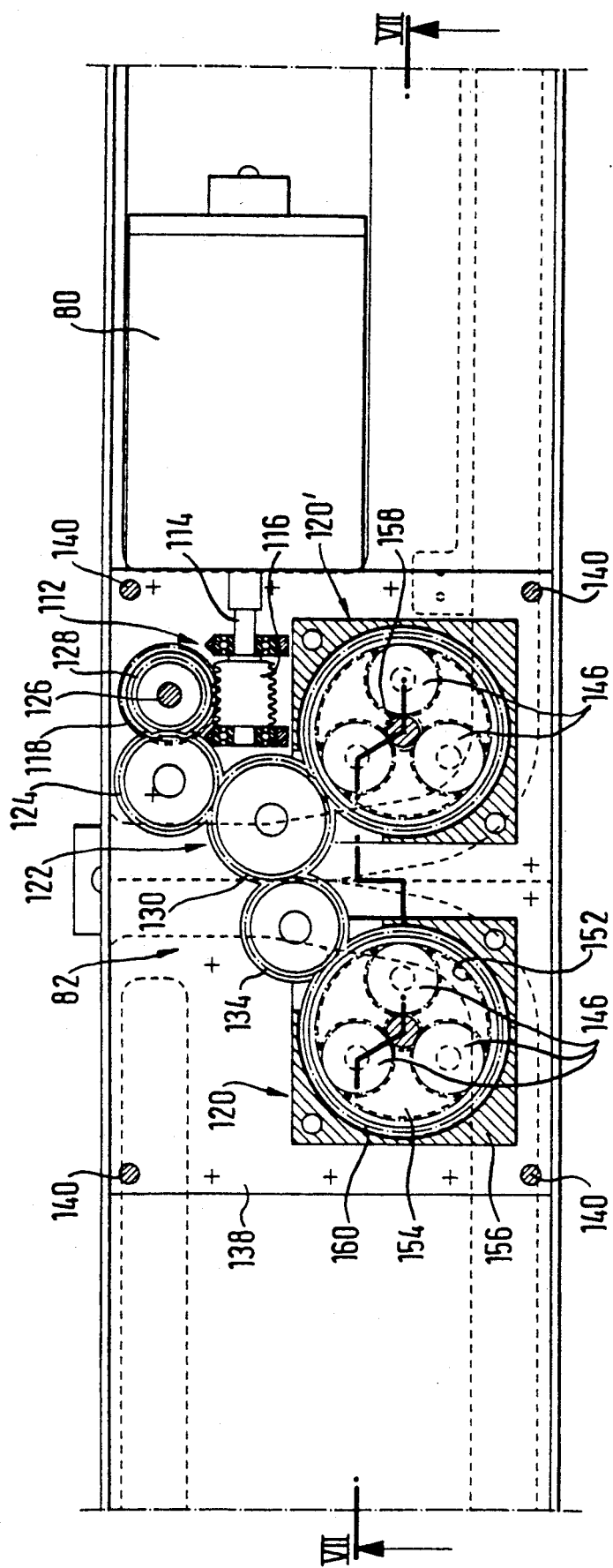
FIG. 6 is a section through the device from above along the line VI—VI in FIG. 7.

The device for opening and closing the panel of a window, door, ventilation hatch, or similar closure that will now be specified is distinguished for high operating power, a wide opening angle, and compactness. It can accordingly be employed in particular either where direct manual operation is impossible (because the panel is too hard to reach) or where automatic operation is desired. Automatic operation is desirable, for example, when ventilation is to be centrally controlled, as, for example, in conservatories and greenhouses. It is also desirable in the smoke-and-heat exhaust systems employed in combatting fires.

The opening-and-closing device in accordance with the invention is primarily used for tilting or swinging open panels or leaves attached to a frame by a pivoting articulation because the transmission functions both as a brace that secures the panel at a desired angle and as an arm that varies the angle as desired. This combination of functions is a result of the transmission's high axial resistance to both tension and compression. It may in some circumstances be desirable to displace the panel in a straight line as well, which can generally be accomplished with simpler devices employing a rack and pinion.

A device 10 for opening and closing the panel of a window, door, ventilation hatch, or similar closure comprises a transmission 14 activated by a mechanism 12. Transmission 14 consists of two chains 16, 16' that can only curve away from each other. The ends of chains 16, 16' at the top of FIGS. 1 and 2 are attached at two immediately adjacent points 18, 18' of attachment to a C-shaped holder 20. Holder 20 itself is secured to the panel 22 that is to be opened. The attachment will be rigid, at least when the opening angle is not wide. In many cases, however, a pivoting attachment will be preferred in order to relieve transmission 14 from bending moments in the direction in question.

The pivoting articulation 24 schematically illustrated in FIGS. 2 and 5 has for this purpose an axis 26. Axis 26 is perpendicular to the axes of articulation 28 (extending perpendicular to the plane of the drawing in FIGS. 1 and 2) of the link 30 of chains 16, 16'. As will be evident from FIG. 8, the axis 26 also parallels the axis 32 of the pivoting articulation 36 of panel 22 (a roof hatch, in this case) to a stationary frame 34.

Transmission-activating mechanism 12 similarly pivots on frame 34 on an axis 38 that parallels the axes 26 and 32. This design ensures that, in spite of the motion of the points 18, 18' of attachment of the ends of the chains along a circular arc 39 about the pivot axis 36 as panel 22 opens and closes, transmission 14 and transmission-activating mechanism 12 will always be in a straight line, so that the transmission will never be subjected to bending moments. In simpler embodiments, especially when the panel does not need to open very far and/or when the operating forces do not need to be as powerful, at least transmission-activating mechanism 12 could conceivably be rigidly fastened to the frame or panel as illustrated in FIGS. 10-12. The chains 16, 16' in transmission 14 can in this event curve approximately in the arc of a circle, which will be possible if the chains are flexible enough. The chains can be made flexible by making the links of plastic and/or providing sufficient play between them. The curvature extends along a plane A that accommodates the length A of the chains and is perpendicular to the plane of curvature (the plane of projection of FIG. 2) of one-way curving chains 16, 16', a simple way of maintaining the chains' mutual support.

The pivoting articulation 24 between the ends of the chains and the panel can comprise, for example, a plate 42 secured to panel 22 with screws 40 and accommodating an articulation eye 44. Eye 44 can be secured between two corresponding articulation eyes 46 in the vicinity of the chains by a pin 48 that extends through all three eyes and constitutes the axis 26 of pivoting articulation 24. Articulation eyes 46 can in turn be secured to C-shaped holder 20 by another C-shaped holder 50 and a rivet 52.

The articulation 54 that defines axis 38 can be similar. The schematic representation in FIG. 2 illustrates an articulating component 56 on the frame and another articulating component 58 on the transmission-activating mechanism in conjunction with a pin 60 that defines axis 38 and fastens the two components together. A similar but unillustrated arrangement is at the end to the left in FIG. 2. Other types of articulations, piano hinges for example, are also possible, of course.

Chains 16, 16' extend back-to-back from adjacent points 18, 18' of attachment to their points 62, 62' of emergence from (or entry into) transmission-activating mechanism 12. Since points 62, 62' of emergence are also directly adjacent, chains 16, 16' are forced to extend straight between transmission-activating mechanism 12 and interior points 18, 18' of attachment no matter how far they have emerged from the activating mechanism. Since, as hereintofore specified, the backs of the chains, which are opposite the sides they curve out from, rest against each other while the chains are extended, each chain prevents the other from curving.

To further improve cohesion between chains 16, 16', and especially to ensure silent operation and to make it possible to transmit transverse forces parallel to the axes 28 of articulation of links 30 between the chains and increase rigidity, the backs 64, 64' of chains 16, 16' interlock. The links 30 of the chain 16 and the links 30' of the chain 16' in the simple-to-manufacture embodiment illustrated in FIG. 3 have ridges 66, 66' that fit into matching grooves in the other chain.

To improve cohesion between chains 16, 16' even further, the alternative illustrated in FIG. 4 can have a dovetail-like insertion type of connection between links 30 and 30'. This connection comprises an undercut groove 68' in link 30', for example, and a ridge 70 fitting into it and on the other link 30. Since chains 16, 16' must be capable of separating by curving, each in its permitted direction (so that the individual lengths can be compactly accommodated inside transmission-activating mechanism 12), the dovetail connection illustrated in FIG. 4 can come apart due to the elasticity and resilience of its components. The ridge 70 in the illustration, for example, has a longitudinal slot 72 opening toward groove 68' that provides it with resilience.

To improve the mechanical stability and especially the resistance to axial compression of transmission 14, chains 16, 16' are mutually displaced by approximately half the length of one link 30 (between axes 28) as they extend between points 18, 18' of attachment and points 62, 62' of emergence in direction A. This displacement is attained in that C-shaped holder 20 makes accordingly displaced points 18, 18' of attachment available. Due to the displacement accordingly, the (rigid) mid-section of a link 30' or 30 in one chain 16' or 16 will always be next to an articulation in one of the links 30 or 30' in the other chain 16 or 16'. This feature will make the chains more rigid.

Transmission-activating mechanism 12 has a box-like fully-enclosed housing 74, preferably made of sheet metal and with a removable cover 76. Housing 74 accommodates two cogwheels 78, 78' that advance chains 16, 16' and are powered by an electric motor 80 by way of intermediate gears 82 as well as passages 84 and 84' for the chains 16, 16'.

Passage 84 is created by two flat components 86 and 88. Each such component has a channel 90, 92 that is as wide and half as high as its chain plus a little extra tolerance to allow the chain to slide back and forth easily inside the passage. Channels 90, 92 open toward each other and are precisely congruent, leaving the completely enclosed passage 84 for chain 16 between them. Flat components 86, 88 are preferably plastic, making them inexpensive to manufacture and low in friction. The passage 84 illustrated in FIG. 2 is approximately U-shaped, allowing it to accommodate more of the chain.

The passage 84' for chain 16' similarly comprises two flat components 86' and 88'. The end of passage 84' has a lateral expansion 91 that accommodates a microswitch 93. Switch 93 emits a signal when chain 16' is completely retracted, switching the motor off automatically. The retracted position is illustrated in FIG. 1.

A similar microswitch 94 that senses when chain 16' is all the way out (and the panel accordingly all the way open) is accommodated in an appropriate expansion 96 in passage 84' in the vicinity of chain-drive cogwheel 78'. Like switch 93, switch 94 is triggered by a lateral projection 98 on ultimate link 100, automatically switching the motor off when the panel is all the way open.

Passages 84, 84' guide their associated chains 16, 16' past cogwheels 78 and 78' and on. The wraparound angles are slightly less than 90°. Beyond cogwheels 78, 78', passages 84, 84' merge into a common passage 102 that terminates at longitudinal side 104, at the top in FIG. 1, of the housing, the longitudinal axis of which extends in direction A, where it defines points 62, 62' of emergence. The cross-section of passage 102 corresponds to the cross-section of transmission 14 and hence to the cross-section of chains 16 and 16' with their backs 64, 64' together and interlocking (FIGS. 3 and 4). In consequence of this geometry, when cogwheels 78, 78' advance chains 16, 16' out of the retracted state illustrated in FIG. 1 into the outermost position illustrated in FIG. 2, the chains will merge increasingly in the vicinity of the cogwheels until they come into contact in passage 102.

When chains 16, 16' are retracted on the other hand, the links 30, 30' of the two chains 16, 16' will come apart. To facilitate separation, the longitudinal ends of ridges 66, 66' are round to prevent them from hooking onto a bow-like point 110. Bow-like point 110 is constituted by the walls of flat parts 86, 88 or 86', 88' ending as passages 84 and 84' merge remote from chain-drive cogwheels 78, 78'. The result is that the links 30, 30' of chains 16, 16' are brought together and separated like the links in a zipper.

Intermediate gears 82 include a worm gear 112 with a worm 116 mounted tight on the shaft 114 of motor 80 and a cogwheel 118 that engages the worm. Intermediate gears 82 also include planetary gears 120, 120' that drive cogwheels 78 and 78'. An intermediate spur gear 122 connects worm gear 112 to planetary gears 120, 120'. Intermediate spur gear 122 comprises an intake cogwheel 124 that meshes with a cogwheel 128 mounted tight on the shaft 126 of the worm wheel as indicted in FIG. 6. Cogwheel 124 also meshes with a cogwheel 130 that directly drives worm gear 120' and, by way of a direction-reversing intermediate cogwheel 134, planetary gear 120.

To mechanically stabilize the components of intermediate gears 82 and cogwheels 78, 78' and allow simple and rapid installation and removal, the components are mounted on two bases 136, 138 separated to the requisite extent in the embodiment illustrated in FIG. 4 by spacers 140.

Figure 7:
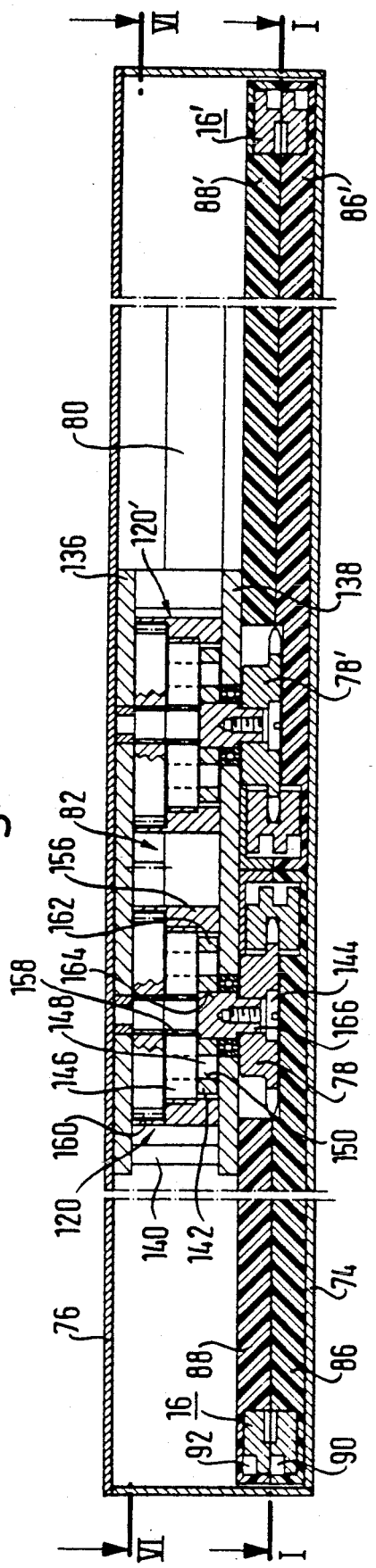
FIG. 7 is a section from the front along the line VII—VII in FIG. 6.

Planetary gears 120, 120' are identical in structure. Tightly connected to cogwheels 78 and 78' by a coaxial screw 144 (FIG. 7) is a planet-wheel support 142. Support 142 supports three planet wheels 146 that rotate on journals 148 in matching depressions 150 in the support 142. Planet wheels 146 engage stationary inner-surface teeth 152. Teeth 152 are accommodated in a planetary-gear chamber 154 cast into a planetary-gear housing 156. Planetary-gear housing 156 can to advantage be created out of an appropriately shaped block of plastic or diecast zinc tensioned between bases 136, 138.

Planet wheels 146 also mesh with the teeth 158 on a sun wheel tightly connected to a coaxial intake cogwheel 160. Intake cogwheel 160 meshes in turn with either cogwheel 134 (in planetary gear 120) or cogwheel 130 (planetary gear 120').

To further reduce the costs of manufacture, planetwheel support 142 is in two parts, with a disk 162 that accommodates depression 150 and an interior quadrilateral depression 164 and with a driving arbor 166 with an outer polygon that engages the quadrilateral depression 164 and a threaded bore for screw 144.

Due to the multiple transmission ratio of intermediate gears 82 by way of worm gear 112, intermediate gear 122, and planetary gears 120 and 120', a relatively small and hence less expensive but rapidly-operating motor 80 can be employed at a high drive moment in relation to cogwheels 78, 78'. Intermediate gears 82 are also automatically locking, especially because of worm gear 112, which ensures that the panel can be reliably secured in any opening position and kept closed even in high winds.

Figure 8:
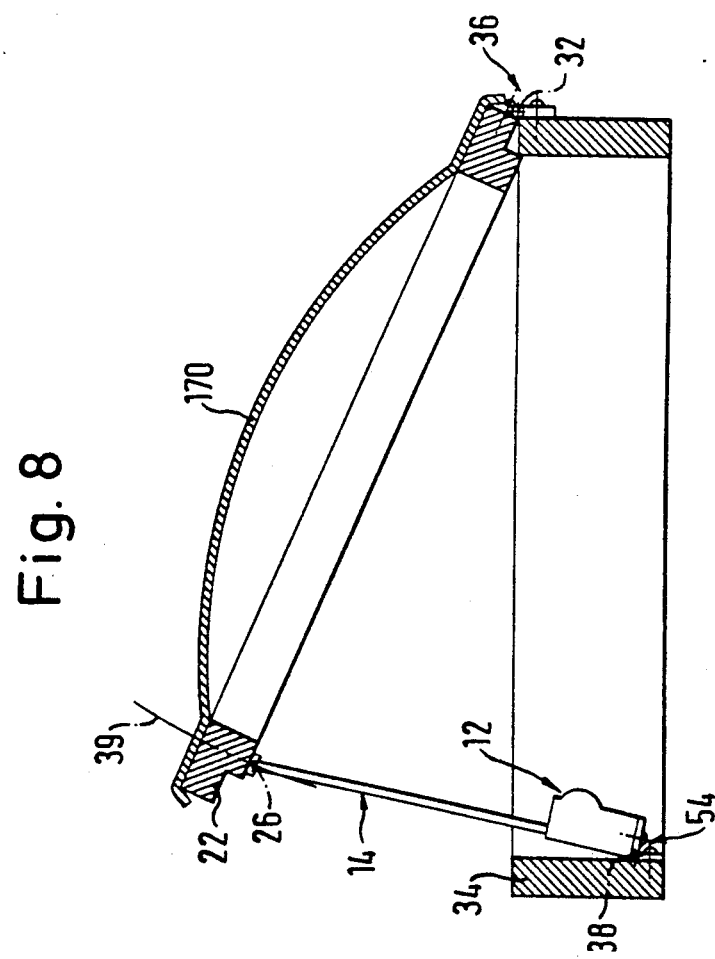

The device 10 described in the foregoing is accordingly widely applicable as will now be described with reference to various examples. The previously discussed FIG. 8 illustrates how the device can be employed with a hatch on a roof. Panel 22 can, depending on the application, support a transparent or translucent glass dome 170 or an opaque roofing component. In the last case, the hatch will be employed only for ventilation or for exhausting smoke and heat.

Figure 9:
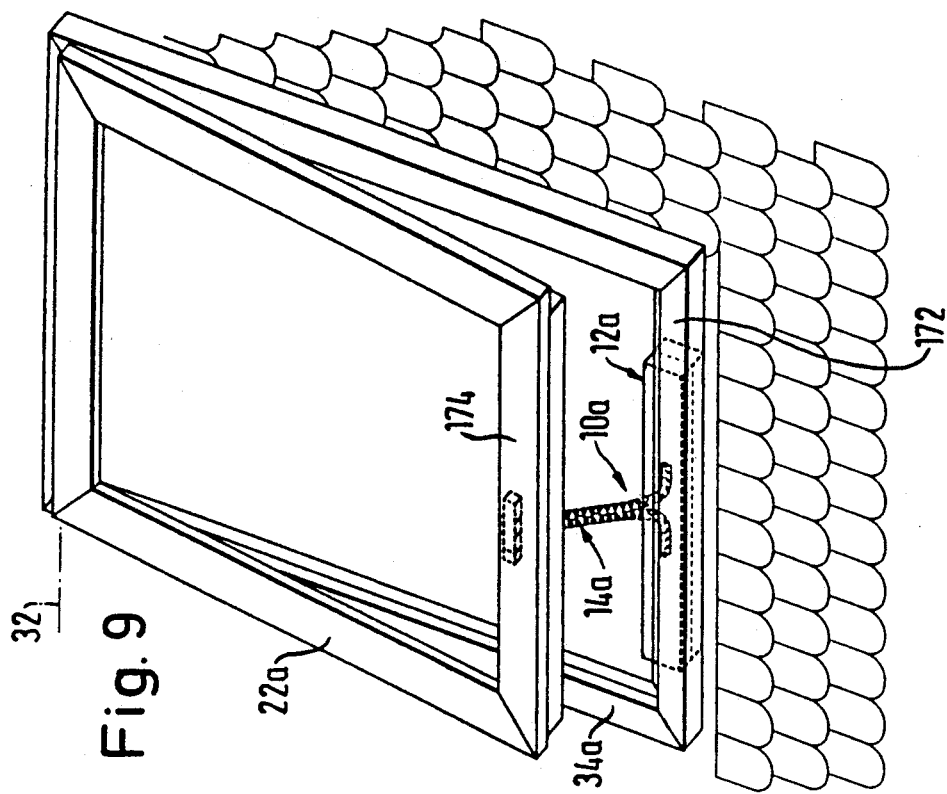

Another application, represented by FIG. 9, is in conjunction with roof-mounted windows. The figure shows a stationary frame 34a that slopes with the roof and a window panel 22a with a horizontal pivoting axis 32 at the top of the frame and panel. Device 10a is accordingly in the vicinity of the lower sleeper, at the end of the window remote from axis 32. To save space, the transmission-activating mechanism 12a in this embodiment is mounted on frame sleeper 172, and the free end of transmission 14a on panel sleeper 174. Due to the maximal length of transmission 14a needed to open the window and to the maximal force that must be exerted, either transmission-activating mechanism 12a and transmission 14a can pivot on their respective frame sleepers 172, 174 as illustrated in FIG. 8 or at least transmission-activating mechanism 12a can be stationary. The consequence of the last approach is that the transmission will curve into the arc of a circle when the panel is open, as shown in FIGS. 10 and 12.

The device 10b illustrated in FIG. 10 is employed with a conventional tilt-open window in the vicinity of the upper sleepers 176, 178 of frame 34b and panel 22b. The window's horizontal axis 32 of pivoting articulation (the tilting axis), on the other hand, is at the bottom of the window. The transmission-activating mechanism 12b in the illustrated example is mounted at the upper sleeper 178 of the panel frame and the free end of transmission 14b on stationary-frame sleeper 176. For a crank-open tilt-out window with a vertical axis 33 of rotation, the free end of the activating mechanism is briefly removed, either manually and with a rod fitting if necessary or with a stepped motor, from the point 18b of attachment on frame 17b before cranking. The device can in principle also be employed for cranking open and closed, especially if another device 10e is mounted on the axis-remote vertical riser with a transmission-activating mechanism 12e and with an activating linkage loosely mounted at point 18e of attachment.

The points of attachment in the embodiment illustrated in FIG. 11 are reversed as compared with FIG. 10. This is another case of a tilt-open window with an axis 32 at the bottom. Device 10c is at the upper end of the window, whereby transmission-activating mechanism 12c extends into the building from upper frame 176. Due to the projection a of transmission-activating mechanism 12c beyond the frame and into the building, the point 18c of attachment of transmission 14c to upper panel-frame sleeper 178 is correspondingly displaced inward with a spacer 180 with an approximately Z-shaped cross-section.

FIG. 12 illustrates how a device 10d can be employed with a window that tilts out around an axis 32 at the top. Since the transmission-activating mechanism 12d in this embodiment is mounted at the edge of the frame 34d remote from the opening direction, there is no need for a spacer 180, and the device can be secured directly to panel 22d.

To ensure that the window can be opened in an emergency even in the event of motor failure, an emergency mechanism can be provided in the form of a crank that can be attached as needed to intermediate gears 82.

While specific emodiments of the invention have been shown and described in detail to illustrate the application of the inventive principles, it will be understood that the invention may be embodied otherwise without departing from such principles.

The reference numerals in the claims are only used for facilitating the understanding and are by no means restrictive.

We claim:

1. Device for opening and closing a panel (22) of a window, door, ventilation hatch, or similar closure, comprising a transmission (14) that extends between the panel (22) and a stationary frame (34), and a mechanism (12) mounted on the panel (22) or on the frame (34) for activating the transmission (14), wherein the transmission (14) constitutes a chain (16) that will curve in only one direction, its links (30) being articulated such that it is deflectable out of a straight line only to one side, the deflection side, in a plane perpendicular to the axes (28) of articulation, the chain (16) extending straight out from its point (62) of emergence from the transmission-activating mechanism (12) to its point (18) of attachment to the frame or panel (22), and at least one section of the chain curving inside the transmission-activating mechanism, wherein the transmission (14) comprises two chains (16, 16'), each of which is bendable only in one direction opposite that of the other, whose points of attachment (18, 18') and points of emergence (62, 62') are both directly adjacent, so that the chains (16, 16') rest back to back (64, 64') between the points of attachment (18, 18') and emergence (62, 62'), and each chain curves out from the side opposite its back, wherein the backs (64, 64') of the chains (16, 16') interlock while they extend straight between their points (18, 18') of attachment and points (62, 62') of emergence, wherein the backs (64, 64') of the chains (16, 16') engage each other by way of a dovetail-like connection comprising an undercut groove (68') that extends along one of the chains (16, 16') and of a ridge (70) that matches the cross-section of the groove on the other chain (16, 16'), whereby the sides of the groove and/or of the ridge (70) are resilient enough to allow the ridge (70) and groove to snap together and apart (FIG. 4).

2. Device for opening and closing a panel (22) of a window, door, ventilation hatch, or similar closure, comprising a transmission (14) that extends between the panel (22) and a stationary frame (34), and a mechanism (12) mounted on the panel (22) or on the frame (34) for activating the transmission (14), wherein the transmission (14) constitutes a chain (16) that will curve in only one direction, its links (30) being articulated such that it is deflectable out of a straight line only to one side, the deflection side, in a plane perpendicular to the axes (28) of articulation, the chain (16) extending straight out from its point (62) of emergence from the transmission-activating mechanism (12) to its point (18) of attachment to the frame or panel (22), and at least one section of the chain curving inside the transmission-activating mechanism, wherein the transmission (14) comprises two chains (16, 16'), each of which is bendable only in one direction opposite that of the other, whose points of attachment (18, 18') and points of emergence (62, 62') are both directly adjacent, so that the chains (16, 16') rest back to back (16, 16') between the points of attachment (18, 18') and emergence (16, 16'), and each chain curves out from the side opposite its back, wherein the two chains (16, 16') are mutually displaced while extending straight between their points (18, 18') of attachment and points (16, 16') of emergence, wherein the chains (16, 16') are pivotable around their points (18, 18') on a C-shaped holder (20) that is common to both chains (16, 16').

3. Device for opening and closing a panel (22) of a window, door, ventilation hatch, or similar closure, comprising a transmission (14) that extends between the panel (22) and a stationary frame (34), and a mechanism (12) mounted on the panel (22) or on the frame (34) for activating the transmission (14), wherein the transmission (14) constitutes a chain (16) that will curve in only one direction, its links (30) being articulated such that it is deflectable out of a straight line only to one side, the deflection side, in a plane perpendicular to the axes (28) of articulation, the chain (16) extending straight out from its point (62) of emergence from the transmission-activating mechanism (12) to its point (18) of attachment to the frame or panel (22), and at least one section of the chain curving inside the transmission-activating mechanism, wherein the transmission (14) comprises two chains (16, 16'), each of which is bendable only in one direction opposite that of the other, whose points of attachment (18, 18') and points of emergence (62, 62') are both directly adjacent, so that the chains (16, 16') rest back to back (64, 64') between the points of attachment (18, 18') and emergence (62, 62'), and each chain curves out from the side opposite its back, wherein each chain (16, 16') is activated by a respective chain-drive cogwheel (78, 78') that engages a curved section of the respective chain (16, 16').

4. Device according to claim 3, wherein each chain-drive cogwheel (78, 78') is connected with a respective planetary gear (120, 120'), and the two respective planetary gears are connected with a common motor (80).

5. Device according to claim 3, wherein only a first one of the chain-drive cogwheels is activated by a planetary gear powered by a motor, and a second one of the chain-drive cogwheels is coupled to the first one.

6. Device according to claim 3, wherein only one of the chains is connected to a chain-drive cogwheel powered by a motor.

7. Device according to claim 3, wherein the transmission-activating mechanism (12) is self locking.

8. Device according to claim 7, wherein a self-locking worm gear (112) connects a motor (80) with at least one chain-drive cogwheel.

9. Device for opening and closing a panel (22) of a window, door, ventilation hatch, or similar closure, comprising a transmission (14) that extends between the panel (22) and a stationary frame (34), and a mechanism (12) mounted on the panel (22) or on the frame (34) for activating the transmission (14), wherein the transmission (14) constitutes a chain (16) that will curve in only one direction, its links (30) being articulated such that it is deflectable out of a straight line only to one side, the deflection side, in a plane perpendicular to the axes (28) of articulation, the chain (16) extending straight out from its points (62) of emergence from the transmission-activating mechanism (12) to its point (18) of attachment to the frame or panel (22), and at least one section of the chain curving inside the transmission-activating mechanism, wherein the transmission (14) comprises two chains (16, 16'), each of which is bendable only in one direction opposite that of the other, whose points of attachment (18, 18') and points of emergence (62, 62') are both directly adjacent, so that the chains (16, 16') rest back to back (64, 64') between the points of attachment (18, 18') and emergence (62, 62'), and each chain curves out from the side opposite its back, wherein the transmission-activating mechanism (12) has at least one flat component (86, 86'; 88, 88') with a channel (90, 92) for one of the chains (16, 16').

10. Device according to claim 9, wherein two flat surface-to-surface components (86, 88; 86', 88') are provided with mutually aligned channels (90, 92), said channels constituting completely enclosed passages (84) for housing the chains (16, 16').

11. Device for opening and closing a panel (22) of a window, door, ventilation hatch, or similar closure, comprising a transmission (14) that extends between the panel (22) and a stationary frame (34), and a mechanism (12) mounted on the panel (22) or on the frame (34) for activating the transmission (14), wherein the transmission (14) constitutes a chain (16) that will curve in only one direction, its links (30) being articulated such that it is deflectable out of a straight line only to one side, the deflection side, in a plane perpendicular to the axes (28) of articulation, the chain (16) extending straight out from its point (62) of emergence from the transmission-activating mechanism (12) to its point (18) of attachment to the frame or panel (22), and at least one section of the chain curving inside the transmission-activating mechanism, wherein the transmission (14) comprises two chains (16, 16'), each of which is bendable only in one direction opposite that of the other, whose points of attachment (18, 18') and points of emergence (62, 62') are both directly adjacent, so that the chains (16, 16') rest back to back (64, 64') between the points of attachment (18, 18') and emergence (62, 62'), and each chain curves out from the side opposite its back, wherein a planetary gear (120, 120') is provided for driving at least one of the chains (16, 16') and has a support (142) that rotates with a chain-drive cogwheel (78, 78'), a sun wheel that engages an intake cogwheel (160), a housing (156) with teeth (152) around its inner surface, and planet wheels (146) that rotate on the support (142) and engage the teeth (152) in the housing and on the sun wheel (158).

12. Device according to claim 11, wherein the intake cogwheel (160) is connected to a worm gear (112) by way of an intermediate spur gear (122).

13. Device according to claim 12, wherein a worm part (116) of the worm gear (112) is tightly mounted on the output shaft (114) of a motor (80).

14. Device according to claim 12, wherein the intermediate spur gear (122) and the housing (156) are interposed between two gear bases (136, 138).

15. Device according to claim 14, wherein the gear bases (136, 138) are separated by at least three spacers (140).

* * * * *

UNITED STATES PATENT AND TRADEMARK OFFICE
CERTIFICATE OF CORRECTION

PATENT NO. : 5,271,182
DATED : December 21, 1993
INVENTOR(S) : Greisner et al.

It is certified that error appears in the above-identified patent and that said Letters Patent is hereby corrected as shown below:

<u>Cover Page, Col. 2, under References Cited section</u>, the following U.S. references should be included:
```
--4,521,993  6/85   J.C.Tacheny et al.    49/325
  4,382,349  5/83   G.F.Dunphy et al.     49/325
  4,014,136  3/77   J.F.Hemens            49/325
  3,911,802  10/75  R.L.Morden            98/2.14
  3,090,613  5/63   P.E.Bechtold--;       268/99
```
<u>Cover Page, Col. 2, under References Cited section</u>, the following foreign references should be included:
```
--3932086   6/90   Germany
  3936136   6/90   Germany
  1091528   11/67  United Kingdom
  0232803   8/87   EPO
  0165497   12/85  EPO
  5237668   3/77   Japan--;
```
<u>Col. 11, line 23</u>, "(16, 16')" (2nd occurrence) should read --(64, 64')--;
<u>Col. 11, line 25</u>, "(16, 16')" should read --(62, 62')--;
<u>Col. 11, line 29</u>, "(16, 16')" should read --(62, 62')--.

Signed and Sealed this

Twelfth Day of July, 1994

Attest:

BRUCE LEHMAN

*Attesting Officer*    *Commissioner of Patents and Trademarks*